United States Patent
Nos et al.

(10) Patent No.: US 9,817,645 B2
(45) Date of Patent: Nov. 14, 2017

(54) REUSABLE APPLICATION CONFIGURATION WITH DYNAMIC RESOURCE DETERMINATION

(71) Applicants: Kathrin Nos, Nussloch (DE); Bjoern Friedmann, Rheinmuenster (DE); Klaus Kiefer, Heidelberg (DE); Michael Engler, Walldorf (DE)

(72) Inventors: Kathrin Nos, Nussloch (DE); Bjoern Friedmann, Rheinmuenster (DE); Klaus Kiefer, Heidelberg (DE); Michael Engler, Walldorf (DE)

(73) Assignee: SAP SE, Walldorf (DE)

( * ) Notice: Subject to any disclaimer, the term of this patent is extended or adjusted under 35 U.S.C. 154(b) by 65 days.

(21) Appl. No.: 14/488,581

(22) Filed: Sep. 17, 2014

(65) Prior Publication Data

US 2016/0077818 A1 Mar. 17, 2016

(51) Int. Cl.
| | |
|---|---|
| G06F 9/44 | (2006.01) |
| G06F 9/445 | (2006.01) |
| H04L 12/24 | (2006.01) |
| G06F 9/50 | (2006.01) |
| G06F 21/33 | (2013.01) |
| H04L 29/08 | (2006.01) |
| H04L 29/06 | (2006.01) |

(52) U.S. Cl.
CPC ............ *G06F 8/60* (2013.01); *G06F 9/44521* (2013.01); *G06F 9/50* (2013.01); *G06F 21/335* (2013.01); *H04L 41/0293* (2013.01); *H04L 67/2814* (2013.01); *H04L 67/40* (2013.01)

(58) Field of Classification Search
None
See application file for complete search history.

(56) References Cited

U.S. PATENT DOCUMENTS

| | | | | |
|---|---|---|---|---|
| 5,408,663 A | * | 4/1995 | Miller | G06Q 10/06 718/104 |
| 6,871,345 B1 | * | 3/2005 | Crow | G06F 8/67 709/203 |
| 7,894,602 B2 | | 2/2011 | Mueller et al. | |
| 8,261,295 B1 | * | 9/2012 | Risbood | G06F 8/61 717/177 |
| 8,762,731 B2 | | 6/2014 | Engler et al. | |

(Continued)

*Primary Examiner* — Insun Kang
(74) *Attorney, Agent, or Firm* — Fish & Richardson P.C.

(57) ABSTRACT

The present disclosure describes methods, systems, and computer program products for providing a deployment of applications across a distributed network environment. A computer-implemented method comprises: receiving, at a server and from a client device, a first request including an identifier of a configuration file accessible to the server and one or more identifiers for one or more resources operated by a remote resource server, wherein the resources are requested by an application executed on the client device; in response to the request, retrieving, by the server, one or more tokens associated with the requested resources; transmitting, by the server, a second request to the remote resource server, the second request including the tokens and identifying one or more data processing tasks to be performed by the resources for the application; and receiving, by the server and from the remote resource server, result data that was outputted by the resources executing the data processing tasks.

19 Claims, 7 Drawing Sheets

(56) References Cited

U.S. PATENT DOCUMENTS

| | | | |
|---|---|---|---|
| 9,065,819 B1* | 6/2015 | Shanmugam | H04L 63/0815 |
| 2003/0023661 A1* | 1/2003 | Clohessy | G06F 9/5016 |
| | | | 718/104 |
| 2006/0168586 A1* | 7/2006 | Stone | G06F 9/485 |
| | | | 718/104 |
| 2007/0005887 A1* | 1/2007 | Larson | G06F 9/468 |
| | | | 711/118 |
| 2008/0120129 A1 | 5/2008 | Seubert et al. | |
| 2009/0182565 A1* | 7/2009 | Erickson | G06Q 10/06 |
| | | | 705/300 |
| 2012/0005215 A1* | 1/2012 | Chow | G06Q 50/01 |
| | | | 707/748 |
| 2012/0144501 A1* | 6/2012 | Vangpat | H04L 63/108 |
| | | | 726/28 |
| 2012/0331476 A1* | 12/2012 | Saffre | G06F 9/5038 |
| | | | 718/104 |
| 2013/0152047 A1* | 6/2013 | Moorthi | G06F 11/368 |
| | | | 717/124 |
| 2013/0332424 A1 | 12/2013 | Nos et al. | |
| 2013/0339079 A1* | 12/2013 | Benayon | G06Q 10/06315 |
| | | | 705/7.25 |
| 2014/0007051 A1* | 1/2014 | Ritter | G06F 8/36 |
| | | | 717/121 |
| 2014/0026131 A1* | 1/2014 | Ravi | G06F 9/44505 |
| | | | 717/177 |
| 2014/0040993 A1* | 2/2014 | Lorenzo | G06F 21/41 |
| | | | 726/4 |
| 2014/0108440 A1 | 4/2014 | Nos | |
| 2014/0280946 A1* | 9/2014 | Mukherjee | H04L 67/16 |
| | | | 709/226 |
| 2014/0282919 A1* | 9/2014 | Mason | H04L 63/0807 |
| | | | 726/4 |
| 2014/0373011 A1* | 12/2014 | Anderson | G06F 9/45533 |
| | | | 718/1 |
| 2015/0089597 A1* | 3/2015 | Srinivasan | H04L 63/08 |
| | | | 726/4 |
| 2015/0089623 A1* | 3/2015 | Sondhi | H04L 63/08 |
| | | | 726/9 |
| 2015/0220325 A1* | 8/2015 | Poon | G06F 8/35 |
| | | | 717/103 |
| 2015/0220330 A1* | 8/2015 | Borden | G06F 8/31 |
| | | | 717/121 |
| 2015/0237049 A1* | 8/2015 | Grajek | H04L 63/0815 |
| | | | 726/7 |
| 2015/0365275 A1* | 12/2015 | Iliev | H04L 41/5096 |
| | | | 709/220 |

* cited by examiner

REUSABLE APPLICATION CONFIGURATION WITH DYNAMIC RESOURCE DETERMINATION

TECHNICAL FIELD

The present disclosure relates to software, computer systems, and computer-implemented methods for providing a reusable application configuration with dynamic resource determination.

BACKGROUND

Modern applications can enable customers to access and leverage updates efficiently. In many instances, customers can access data from a single application. For data processing within a single or between different applications, data may need to be copied, processed, transferred, or manipulated at remote data processing resources to be useable at the application(s). For example, customer data stored or processed at a server may need to be accessible by a remote data processing device to be useable for an application running on the remote data processing device. In some other instances, a central database (e.g., held by a third party) may also be used to provide access to data processing resources for multiple applications or business products running on several remote data processing devices.

Open standard for authorization ("OAuth") is an open protocol to allow secure authorization in a simple and standard method from web, mobile and desktop applications. An OAuth request contains scopes for which access can be granted. A resulting access token contains a list of scopes for which a server finally grants access. For each client, usually a static list of scopes is provided, as for instance in ABAP systems. However, if each application delivers its own OAuth client configurations, huge efforts for maintenance may be required by a system administrator.

SUMMARY

The present disclosure describes computer-implemented methods, systems, and computer program products for providing a reusable application configuration with dynamic resource determination.

One or more of the following aspects of this disclosure can be embodied alone or in combination as methods that include the corresponding operations. One or more of the following aspects of this disclosure can be implemented alone or in combination in a device comprising a processor, a processor-readable medium coupled to the processor having instructions stored thereon which, when executed by the processor, cause the processor to perform operations according to the one or more of the following aspects. One or more of the following aspects of this disclosure can be implemented alone or in combination on a computer program product encoded on a non-transitory, tangible storage medium, the product comprising computer readable instructions for causing one or more computers to perform the operations according to the one or more of the following aspects.

A general aspect 1 includes a computer-implemented method for deploying an application across a distributed network environment, the method comprising: receiving, at a server and from a client device, a first request including an identifier of a configuration file accessible to the server and one or more identifiers for one or more resources operated by a remote resource server, wherein the resources are requested by an application executed on the client device; in response to the request, retrieving, by the server, one or more tokens associated with the requested resources; transmitting, by the server, a second request to the remote resource server, the second request including the tokens and identifying one or more data processing tasks to be performed by the resources for the application; and receiving, by the server and from the remote resource server, result data that was outputted by the resources executing the data processing tasks.

Aspect 2 according to aspect 1, wherein the configuration file includes address data for the remote resource server and the resources operated by the remote resource server, wherein the address data is used for the second request to initiate the execution of the data processing tasks by the resources.

Aspect 3 according to any one of aspects 1 to 2, wherein the token includes client device authentication data for the remote resource server or the resources, wherein the authentication data is used for the second request to initiate the execution of the data processing tasks by the resources.

Aspect 4 according to any one of aspects 1 to 3, wherein the remote resource server is communicatively connected with the server using a local or wide area network connection but is not directly connected with the client device.

Aspect 5 according to any one of aspects 1 to 4, wherein the application does not contain address data for the remote resource server or the resources.

Aspect 6 according to any one of aspects 1 to 5, wherein the address data includes one or more uniform resource locators (URLs) that identify the remote resource server and the associated resources and wherein the second request uses the URLs to connect the server to the resources.

Aspect 7 according to any one of aspects 1 to 6, wherein the identifier of the configuration file includes a name of the file and an identifier of a location on a data storage connected with the server.

Aspect 8 according to any one of aspects 1 to 7, further comprising: before the retrieving of the one or more tokens associated with the requested resources, pre-processing of the maximum number of resources required by the application, wherein the pre-processing comprises: determining a list of all required resources for the application; determining that some of the determined resources in the list is already included in the configuration file; determining that some of the determined resources in the list is not already included in the configuration file; and adding only the determined resources in the list that are not already included in the configuration file to the configuration file to render the list of maximum number of resources, wherein the retrieving of the one or more tokens associated with the requested resources includes retrieving the tokens for the list of maximum number of resources from the remote resource server.

Aspect 9 according to any one of aspects 1 to 8, further comprising: before the retrieving of the one or more tokens associated with the requested resources, pre-processing of the maximum number of resources required by the application, wherein the pre-processing comprises: determining a list of all required resources for the application; determining that a token stored in a storage is not valid for one or more of the required resources for the application; storing the list in the storage, wherein the retrieving of the one or more tokens associated with the requested resources includes retrieving the tokens for the list of required resources from the remote resource server.

Aspect 10 according to any one of aspects 1 to 9, further comprising: performing a parallel pre-processing by the server, wherein the parallel pre-processing comprises: determining at least one criterion associated with the task; based on the determined criterion, selecting a number of resources to use in the task processing by the remote resource server, and performing the task processing by the remote resource server based on the selected number resources.

Aspect 11 according to any one of aspects 1 to 10, further comprising: receiving, by the server, a command to add or remove an application executable by the client device; updating, by the server, a list of resources required for all current applications executable by the client device, wherein the list is stored in the configuration file; wherein the retrieving of the one or more tokens associated with the requested resources includes retrieving the tokens for the updated list of required resources from the remote resource server.

Aspect 12 according to any one of aspects 1 to 11, wherein the retrieving of the one or more tokens associated with the requested resources includes retrieving the tokens from a storage or from the remote resource server.

The details of these and other aspects and embodiments of the present disclosure are set forth in the accompanying drawings and the description below. Other features, objects, and advantages of the disclosure will be apparent from the description and drawings, and from the claims.

Figure 1:
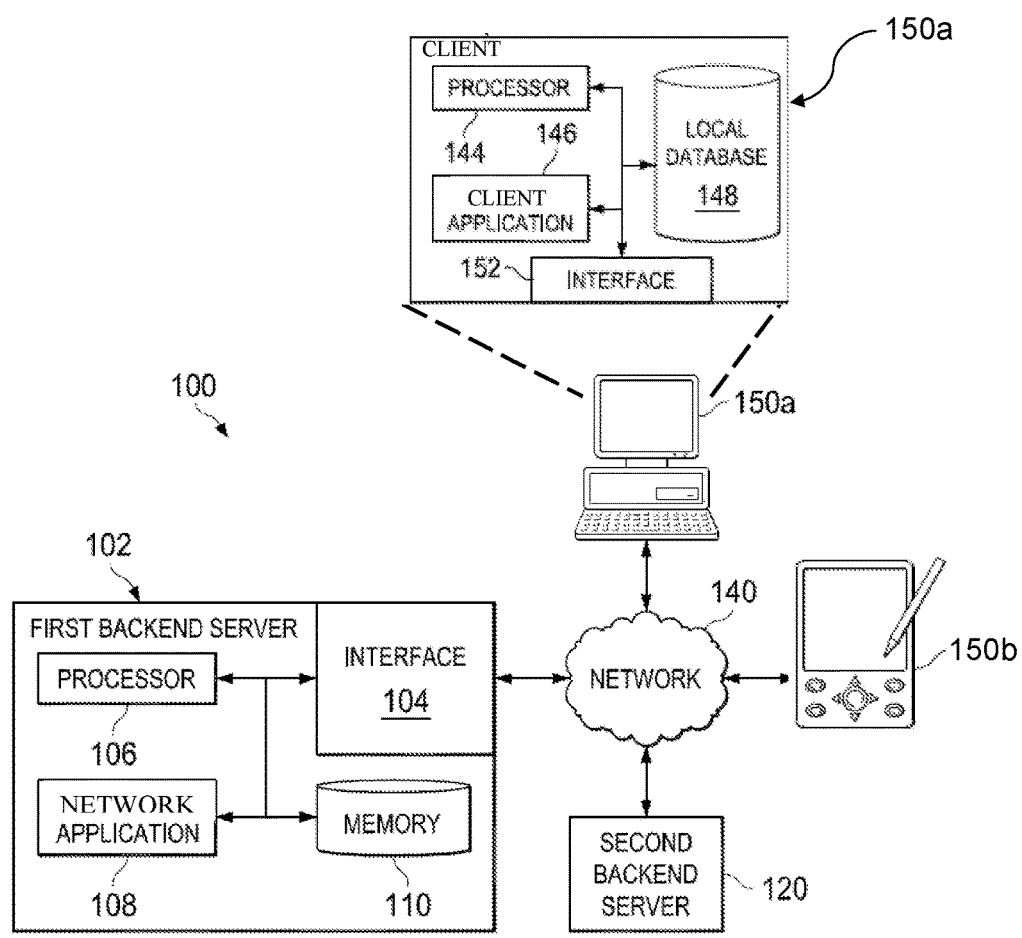
FIG. 1 illustrates an example of a network environment according to an implementation.

Reference numbers and designations in the various drawings indicate exemplary aspects, implementations or embodiments of particular features of the present disclosure.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

This disclosure generally relates to software, computer systems, and computer-implemented methods for providing a reusable application configuration with dynamic resource determination. Specifically, a centrally managed application configuration is provided to develop, run and manage multiple applications on various remote data processing resources. Implementations of the present disclosure described herein may provide one or more of the following advantages:

First, a less time consuming and resource consuming deployment of applications is provided, which allows local developers to easily and rapidly create and run applications that require various remote resources. The amount of required data processing resources is dynamically tracked to more efficiently access and allocate the resources.

Second, the centrally-managed configuration application circumvents the need for local configuration and resource allocation management at local client devices for each application. In particular, a local developer can dynamically add or remove applications without having to provide additional configuration details that may be specific to the communication protocols. For example, in some implementations, developers need only know which applications they want to access and which resources belong to the applications, but do not need to know additional configuration details.

Third, infrastructure and efforts needed for the deployment of an application and resource allocation may be reduced to a minimum. The described approach may thereby reduce the total cost of ownership.

Fourth, multiple mobile applications can be developed, run and/or managed in parallel by multiple developers and/or users across local and/or wide area networks. Further, the deployment of applications may be scalable with respect to the number of applications managed in parallel and with respect to the number of developers and users accessing applications.

Fifth, the described approach may keep a number of round-trips low so that the required number of interactions for a developer or end-user is reduced, thereby improving user experience.

Sixth, more efficient access to and ability to prototype applications may increase speed of research and development related to machines or technical processes, thereby providing an improved tool for a developer of such machines or processes.

FIG. 1 illustrates an example of a network environment 100 according to an implementation for implementing various features of a system for providing a lightweight deployment of mobile applications which are managed in a cloud-computing environment. The illustrated environment 100 includes, or is communicably coupled with, a (e.g., front-end) client 150*a-b*, which represents a user or developer installation (e.g., an on-demand or an on-premise installation), and backend server systems 102, 120. In some instances, the front-end client 150*a-b* may co-reside on a single server or system, as appropriate. At least some of the communications between the client 150*a-b* and the backend servers 102, 120 may be performed across or using network 140 (e.g., using a wide area network (WAN) such as the Internet). The server 102, 120 may process data input received from the client devices 150*a*, 150*b* by using the Open Data Protocol (OData), which is a data access protocol. The OData protocol was designed to provide standard create, read, update, and delete access to a data source using a website. OData may be used to access table-like structures similar to the way Structured Query Language (SQL) does with data in a database, wherein an OData service may correspond to a database schema and an entity may correspond to database table. Customers (e.g., users of client devices 150*a*, 150*b*) may run on-premise systems in hybrid landscapes together with on-demand systems, consuming data from both.

In some implementations, the server 102, 120 can communicate with client device 150*a*, 150*b* using the OData protocol through hypertext transfer protocol (HTTP) or hypertext transfer protocol secure (HTTPS) requests. In some implementations, the server 102, 120 can use a remote function call (RFC) interface to communication with advanced business application programming (ABAP) language and/or non-ABAP programs.

In an aspect, environment 100 depicts an example configuration of a system for establishing business networks using networked applications built on a shared platform in a cloud computing environment, such as environment 100. The client 150*a-b* and/or the server 102, 120 include development technology and hosted and managed services and applications built on top of the underlying platform technology. In an implementation of the present disclosure described herein, the term "platform technology" is understood as types of Java development platform, such as e.g., Enterprise JAVABEANS (EJB), J2EE Connector Architecture (JCA), JAVA Messaging Service (JMS), JAVA Naming and Directory Interface (JNDI), and JAVA Database Connectivity (JDBC). In an implementation of the present disclosure described herein, the term "platform technology" includes an SAP BYDESIGN platform, Success Factors Platform, SAP NETWEAVER Application Server JAVA, ERP Suite technology or in-memory database such as a High Performance Analytic Appliance (HANA) platform.

The illustrated environment 100 of FIG. 1 includes one or more (e.g., front-end) clients 150*a-b*. The client 150*a-b* may be associated with a particular network application or a development context, as well as a particular platform-based application system. The client 150*a-b* may be any computing device operable to connect to or communicate with at least one of the servers 102, 120 using a wireline or wireless connection using the network 140, or another suitable communication means or channel. In some instances, the client 150*a-b* may be a part of or associated with a business process involving one or more network applications, or alternatively, a remote developer associated with the platform or a related platform-based application.

In general, the client 150*a-b* includes a processor 144, an interface 152, a client application 146 or application interface, a graphical user interface (GUI), and a memory or local database 148. In general, the client 150*a-b* includes electronic computer devices operable to receive, transmit, process, and store any appropriate data associated with the environment 100 of FIG. 1. As used in this disclosure, the client 150*a-b* is intended to encompass a personal computer, laptop, tablet PC, workstation, network computer, kiosk, wireless data port, smart phone, personal data assistant (PDA), one or more processors within these or other devices, or any other suitable processing device. The client or tenant 150*a-b* may be a mobile communication device with an interface for a connection to network 140. For example, the client 150*a-b* may include a computer that includes an input device, such as a keypad, touch screen, mouse, or other device that can accept user information, and an output device that conveys information associated with the operation of one or more client applications, on-demand platforms, and/or the client 150*a-b* itself, including digital data, visual information, or GUI.

Both the input and output device may include fixed or removable storage media such as a magnetic storage media, CD-ROM, or other suitable media, to both receive input from and provide output to users of client 150*a-b* through the display, namely, the GUI. The client application 146 or application interface can enable the client 150*a-b* to access and interact with applications and modules in backend server systems using a common or similar platform. The client application 146 allows the client 150*a-b* to request and view content on the client 150*a-b*. In some implementations, the client application 150*a-b* can be and/or include a web browser. In some implementations, the client application 146 can use parameters, metadata, and other information received at launch to access a particular set of data from the server 102, 120. Once a particular client application 146 is launched, the client can process a task, event, or other information which may be associated with the server 102, 120. Further, although illustrated as a single client application 146, the client application 146 may be implemented as multiple client applications in the client 150*a-b*.

There may be any number of clients 150*a-b* associated with, or external to, environment 100. For example, while illustrated environment 100 includes one client 150*a-b*, alternative implementations of environment 100 may include multiple clients communicably coupled to the one or more of the systems illustrated. In some instances, one or more clients 150*a-b* may be associated with administrators of the environment, and may be capable of accessing and interacting with the settings and operations of one or more network applications, and/or other components of the illustrated environment 100. Additionally, there may also be one or more additional clients 150*a-b* external to the illustrated portion of environment 100 capable of interacting with the environment 100 using the network 140. Further, the terms "client," "customer," and "user" may be used interchangeably as appropriate without departing from the scope of this disclosure. Moreover, while the client 150*a-b* is described in terms of being used by a single user, this disclosure contemplates that many users may use one computer, or that one user may use multiple computers. In general, clients usually belong to one customer or company, but can also belong to two or more customers or companies. Several employees of the customer, called users, can use the applications deployed on the corresponding client. For instance, the term "client" refers to a system providing a set of client applications belonging to or rented by a particular customer or business entity. Several employees of that particular customer or business entity can be users of that client and use the network applications provided by or available on this client.

The data stored in the local database 148 may be locked and accessed by the first backend server 102, and interacted with the front-end client 150*a-b*. In other instances, the data may be used by a network application 108 associated with one of the other backend servers 120 for processing applications associated with those systems. For example, one or more of the components illustrated within the backend servers 102, 120 may be located in multiple or different servers, cloud-based or cloud computing networks, or other locations accessible to the backend servers 102, 120 (e.g., either directly or indirectly using network 140). For example, each backend server 102, 120 and/or client 150*a-b* may be a JAVA 2 Platform, Enterprise Edition (J2EE)-compliant application server that includes technologies such as Enterprise JAVABEANS (EJB), J2EE Connector Architecture (JCA), JAVA Messaging Service (JMS), JAVA Naming and Directory Interface (JNDI), and JAVA Database Connectivity (JDBC). In some instances, each of the backend servers 102, 120 may store a plurality of various applications, while in other instances, the backend servers 102, 120 may be dedicated servers meant to store and execute certain network applications built based on the on-demand platform using the on-demand platform technology and on-demand platform business content. In some instances, the backend servers 102, 120 may include a web server or be communicably coupled with a web server, where one or more of the network applications 108 associated with the backend servers 102, 120 represent web-based (or web-accessible) applications accessed and executed through requests and interactions received on the front-end client 150a-b operable to interact with the programmed tasks or operations of the corresponding on-demand platform and/or network applications.

At a high level, the backend servers 102, 120 include an electronic computing device operable to receive, transmit, process, store, or manage data and information associated with the environment 100. The backend servers 102, 120 illustrated in FIG. 1 can be responsible for receiving requests from one or more clients 150a-b (as well as any other entity or system interacting with the backend servers 102, 120, including desktop or mobile client systems), responding to the received requests by processing said requests in an on-demand platform and/or an associated network application, and sending the appropriate responses from the appropriate component back to the requesting front-end client 150a-b or other requesting system. Components of the backend servers 102, 120 can also process and respond to local requests from a user locally accessing the backend servers 102, 120. Accordingly, in addition to requests from the front-end client 150a-b illustrated in FIG. 1, requests associated with a particular component may also be sent from internal users, external or third-party customers, and other associated network applications, business processes, as well as any other appropriate entities, individuals, systems, or computers. In some instances, either or both an on-demand platform and/or a network application may be web-based applications executing functionality associated with a networked or cloud-based business process.

As used in the present disclosure, the term "computer" is intended to encompass any suitable processing device. For example, although FIG. 1 illustrates three backend servers 102, 120, environment 100 can be implemented using any number of servers, as well as computers other than servers, including a server pool. Indeed, the backend servers 102, 120 and/or the clients 150a-b may be any computer or processing device. In other words, the present disclosure contemplates computers other than general purpose computers, as well as computers without conventional operating systems. Further, the illustrated backend servers 102, 120 may be adapted to execute any operating system.

The first backend server 102 is illustrated in details in FIG. 1. The first backend server 102 includes an interface 104, a processor 106, a memory 110, a network application 108, and other components further illustrated in FIG. 2. In some instances, the backend servers 102, 120 and its illustrated components may be separated into multiple components executing at different servers and/or systems. For example, while FIG. 1 illustrates the network application 108 and the processor 106 as separate components, other example implementations can include the processor 106 within a separate system, as well as within as part of the network application's inherent functionality. Thus, while illustrated as a single component in the example environment 100 of FIG. 1, alternative implementations may illustrate the backend servers 102, 120 as comprising multiple parts or portions accordingly.

In FIG. 1, the interface 104 is used by the first backend server 102 to communicate with other systems in a client-server or other distributed environment (including within environment 100) connected to the network 140 (e.g., one of the front-end clients 150a-b, as well as other clients or backend servers communicably coupled to the network 140). The term "interface" 104, 152 generally includes logic encoded software and/or hardware in a suitable combination and operable to communicate with the network 140. More specifically, the interface 104 may include software supporting one or more communication protocols associated with communications such that the network 140 or the interface's hardware is operable to communicate physical signals within and outside of the illustrated environment 100. Generally, the backend servers 102, 120 may be communicably coupled with a network 140 that facilitates wireless or wireline communications between the components of the environment 100 (e.g., among the backend servers 102, 120 and/or one or more front-end clients 150a-b), as well as with any other local or remote computer, such as additional clients, servers, or other devices communicably coupled to network 140, including those not illustrated in FIG. 1. In the illustrated environment, the network 140 is depicted as a single network, but may include more than one network without departing from the scope of this disclosure, so long as at least a portion of the network 140 may facilitate communications between senders and recipients. In some instances, one or more of the components associated with the backend servers 102, 120 may be included within the network 140 as one or more cloud-based services or operations.

As illustrated in FIG. 1, the first backend server 102 includes a processor 106. Although illustrated as a single processor 106 in the backend server 102, two or more processors may be used in the backend server 102 according to particular needs, desires, or particular embodiments of environment 100. The backend servers 120 and 102, as well as other backend systems, may similarly include one or more processors. Generally, the processor 106 executes instructions and manipulates data to perform the operations of the backend server 102, and, specifically, the functionality associated with the corresponding network application 108. In one implementation, the server's processor 106 executes the functionality required to receive and respond to requests and instructions from the front-end client 150a-b, as well as the functionality required to perform the operations of the associated network application 108 and an on-demand platform, among others.

At a high level, the term "software application", "mobile application", "network application" and "cloud application" described in this specification may refer to any application, program, module, process, or other software that may execute, change, delete, generate, or otherwise manage information associated with the server 102, 120, a third party system, or the client device 150a-b, and in some cases, a business process performing and executing business process-related events. In particular, business processes communicate with other users, applications, systems, and components to send, receive, and process events. In some instances, a particular network application 108 may operate in response to and in connection with one or more requests received from an associated client or other remote client. Additionally, a particular network application 108 may operate in response to and in connection with one or more requests received from other network applications external to the backend server 102. In some instances, the network application 108 can be a networked application, for example, the network application 108 is built on a common platform with one or more applications in either or both of the backend servers 120 and 102. In some instances, the network application 108 may request additional processing or information from an external system or application. In some instances, each network application 108 may represent a web-based application accessed and executed by the front-end client 150a-b using the network 140 (e.g., through the Internet, or using one or more cloud-based services associated with the network application 108).

Further, while illustrated as internal to the backend server 102, one or more processes associated with a particular network application 108 may be stored, referenced, or executed remotely. For example, a portion of a particular network application 108 may be a web service that is remotely called, while another portion of the network application 108 may be an interface object or agent bundled for processing at a remote system. Moreover, any or all of a particular network application 108 may be a child or sub-module of another software module or enterprise application (e.g., the backend servers 120 and 130). Still further, portions of the particular network application 108 may be executed or accessed by a user working directly at the backend servers 102, as well as remotely at corresponding front-end client 150a-b.

It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, the processor 106 executes the corresponding network application 108 stored on the associated backend servers 120. In some instances, a particular backend server may be associated with the execution of two or more network applications (and other related components), as well as one or more distributed applications executing across two or more servers executing the functionality associated with the backend servers.

FIG. 1 further includes memory 110 in the backend server 102. For example, the backend server 102 can host a master application for a particular data object, which is stored at the memory 110. The data object stored at the memory 110 may be accessed by other networked applications, for example, by applications of the backend servers 120 and 102. The data access does not require data replication and therefore can be stored at a single location (e.g., the memory 110). In addition, the memory 110 of the backend server 120 stores data and program instructions for the network application 108. The term "memory" refers to any memory or database module and may take the form of volatile or non-volatile memory including, without limitation, magnetic media, optical media, random access memory (RAM), read-only memory (ROM), removable media, or any other suitable local or remote memory component.

The memory 110 may store various business objects, object models, and data, including classes, frameworks, applications, backup data, business objects, jobs, web pages, web page templates, database tables, process contexts, repositories storing services local to the backend server 120 and any other appropriate information including any parameters, variables, algorithms, instructions, rules, constraints, or references thereto associated with the purposes of the backend server 120 and its functionality. In an aspect, the term "business object" is a representation of an intelligible business or non-business entity, such as an account, an order, employee, an invoice or a financial report. In some implementations, including in a cloud-based system, some or all of the memory 110 may be stored remote from the backend server 120 and communicably coupled to the backend server 120 for usage. As described above, memory 110 can include one or more meta-models associated with various objects included in or associated with the underlying platform. Specifically, memory 110 can store items and entities related to the network application 108 and/or other collaboration-related entities or components. Some or all of the elements illustrated within memory 110 may be stored external to the memory 110. These items may be made accessible within the network environment as illustrated in FIG. 2.

Figure 2A:
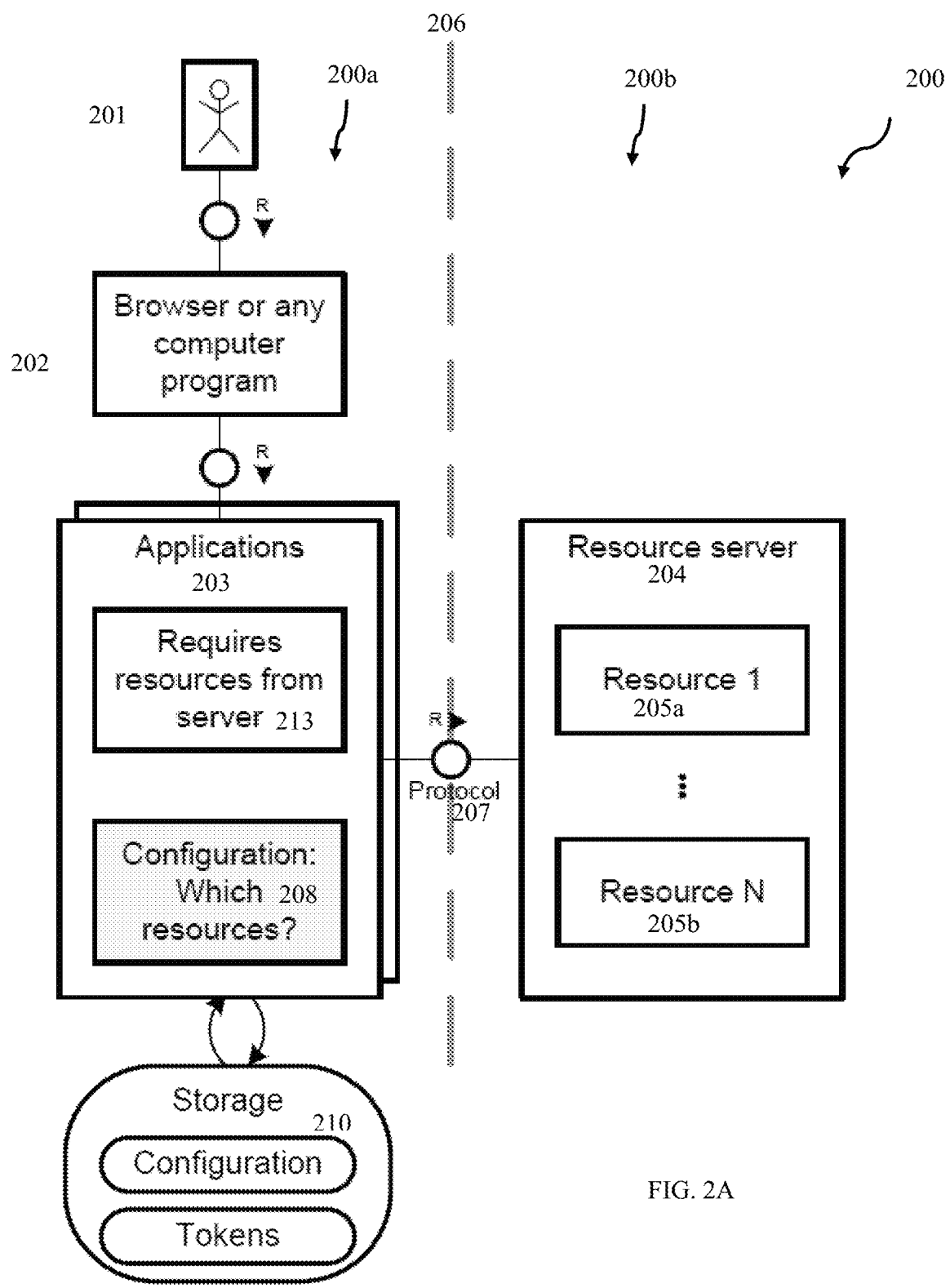
FIG. 2A illustrates an example of a network environment as a starting point for an implementation.

FIG. 2A illustrates an example of a network environment 200 as a starting point for an implementation. The network environment 200 may include a user environment 200a, which may include one or more data processing devices used by a developer 201 to develop, access or run one or more applications 203. For example, the one or more data processing devices may include one or more backend servers 102, 120 and/or one or more client devices 150a, 150b of FIG. 1. For example, user environment 200a may include a server (e.g., 102, 120) operating the reusable configuration 209, and a client device (e.g., 150a, 150b) operated by the developer 201. The server or the client device may execute the applications 203. The developer 201 may access the application 203 through a browser or any other suitable computer program 202, wherein the application may require access to one or more remote resources 205a, 205b executed by a resource server 204 that may be part of a remote network environment 200b. The resource server 204 may be implemented as a single server or as a server platform with multiple servers, for example, the server 204 may include multiple parallel-processing nodes that perform task for the application in parallel. The user environment 200a may further include a storage (e.g., a database) 210 for storing of configuration information and/or tokens as explained below.

For example, the parallel-processing nodes may include multiple processing nodes that execute a portion of the application tasks in parallel so that the tasks are divided into sub-tasks, wherein each node performs an assigned sub-task, or so that an entire application task is executed by each of the nodes in parallel. In an aspect, the processing of application tasks may include: performing a parallel pre-processing of a task by the server 204 or the central framework 211, wherein the parallel pre-processing includes: determining at least one criterion associated with the task; based on the determined criterion, selecting a number of resources 205a, 205b to use in the task processing by the server 204, and performing the task processing by the server 204 based on the selected number resources 205a, 205b. In an aspect, processing of application tasks may also or alternatively include: performing a parallel pre-processing of the task by the server 204 or the central framework 211, wherein the parallel pre-processing includes: determining at least one criterion associated with the task; based on the determined criterion, selecting a number of the nodes to use in the task processing by the server 204, and performing the task processing by the server 204 based on the selected number of nodes.

In an aspect, the criterion may be data quality (e.g., the fraction of incomplete or damaged data records), number of data records to be processed, origin of the received data records, number or type of the applications 203, or the like. One may use modern multiple-core CPUs to divide a particular computing task into parallel subtasks running concurrently, thus speeding up execution time. Open-source and/or proprietary software libraries may be used to implement parallel processing on computational heavy loops. Such loops may occur in task processing, especially when creating and manipulating the applications 203.

Furthermore, the software code 213 of the application 203 may need to be able to identify and to connect with the resources. A user 201 may want to access a program running an application (this access usually is done using a computer program such as a browser 202). This application 203 may require resources 205a, 205b from the resource server 204. In this resource server 204, several resources 205a, 205b may be available. The resource server may be a server by a particular company offering web services and the resources may be calendar, address book, mailbox or the like. Now, only certain resources may be accessed by the application. Reasons for this could be, for example: The user 201 may not want to expose too much information—only what is needed in the context of this application 203. Hence, a call from the application 203 to the resource server 204 may be supposed to specifically ask for the list of desired resources. By introducing a configuration 208, the application can define which resources to access on the resource server. FIG. 2A shows the initial setup with the main actors, i.e. the user 201 who runs an application 203—through a browser or a computer program 202 in general—that accesses resources on another server 204 by using a protocol 207. The box shows the configuration 208 that can be used by the application 203 to decide which resources 205a, 205b shall be accessed. The protocol 207 may be a communication protocol such as OAuth. OAuth may be used for authentication at the resource server 204. The communication to the resource server 204 may be done with another protocol, e.g., OData.

Figure 2B:
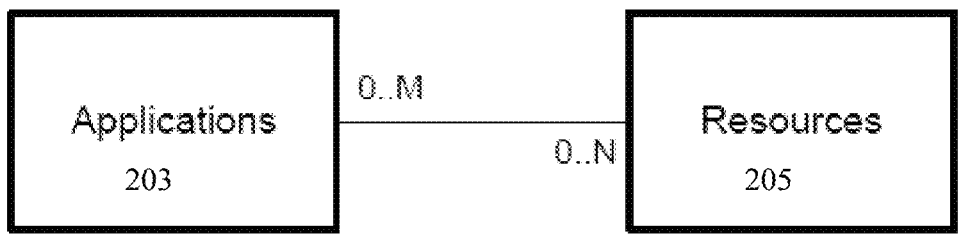
FIG. 2B illustrates the relationship between applications and resources.

FIG. 2B illustrates the relationship between applications 203 and resources 205: Any of the M existing applications 203 in the system could access any of the N resources 205 in the resource server 204. The configuration 208 shown in FIG. 2A would declare which resources 205, 205b one given application 203 wants to access. For example, the application 203 may want to access an electronic calendar 205a and an address book 205b to process data within the application 203. Each of the resources 205 may be a software application provided or maintained by the server 204.

When accessing resources by using a protocol 207, there usually is more information than only the list of resources. A protocol may require information such as how to access the resource server (e.g., resource address, user credentials, or any further attributes for calling the resource server through the given protocol). Hence, the configuration 208 may contain also this information. The maintenance of such a configuration 208 may cause efforts. Usually, system administrators (not shown) need to maintain such information. Depending on which information from the resource server 204 is already known, the application developer 201 can enter information (the whole or at least part of) into the configuration 208 at development time. The description of later figures describes how this configuration can be simplified in a declarative way, and how the configuration can be processed effectively at runtime.

Figure 3B:
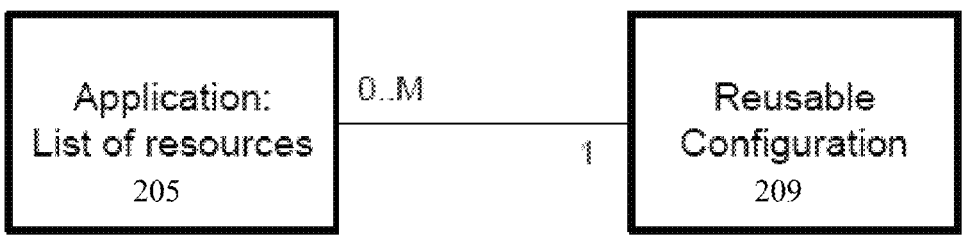
FIG. 3B illustrates the relationship between configuration information and resources.
Figure 3B:
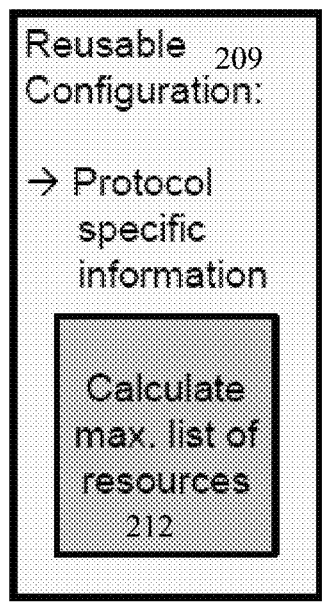
Figure 3A:
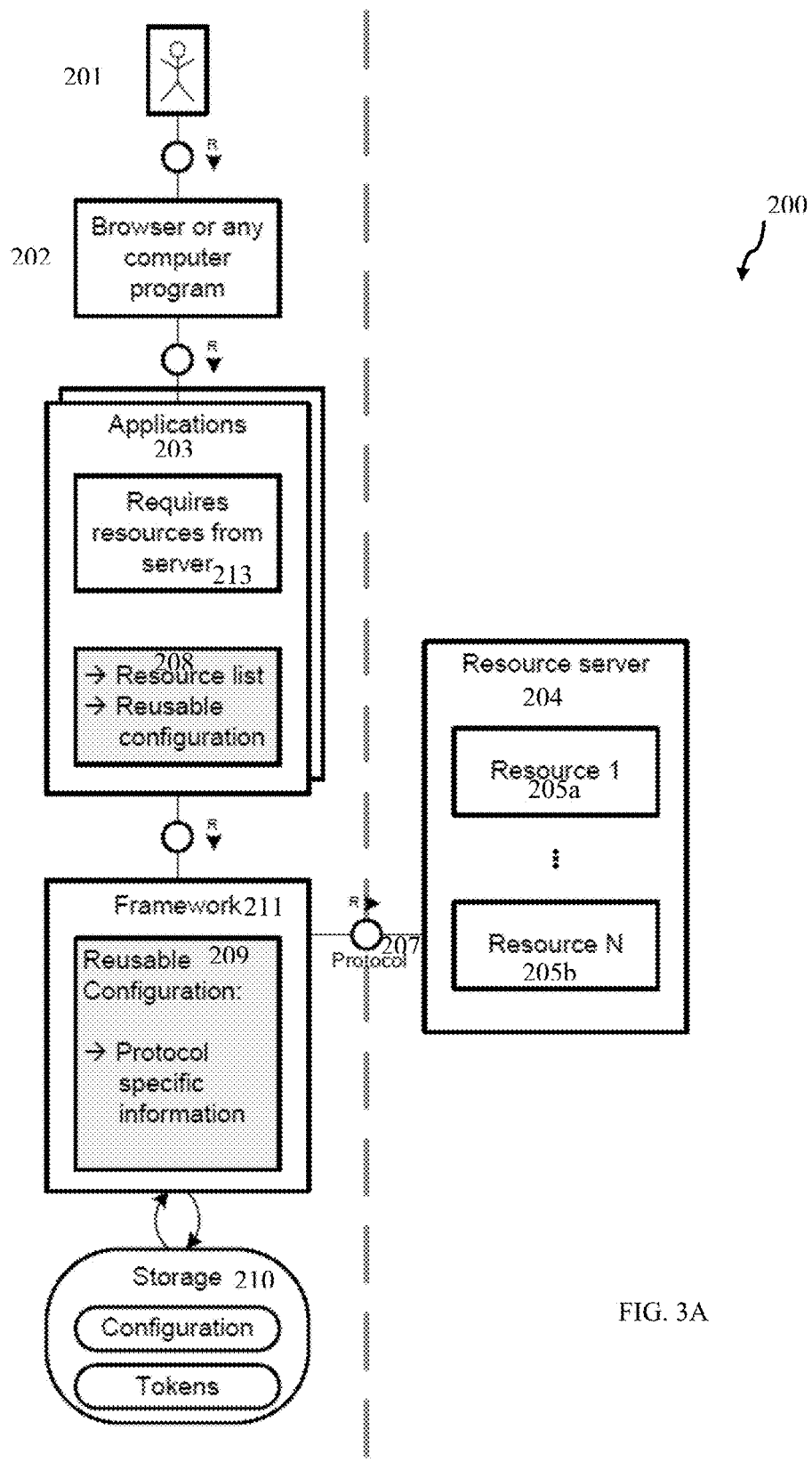
FIG. 3A illustrates an example of a network environment with a specific distribution of configuration information according to an implementation.

FIG. 3A illustrates an example of an improvement of network environment 200 of FIG. 2A with an implementation of a re-usable configuration 209. The network environment 200 may include the remote network environment 200b, which is communicatively connected with a central framework 211 at the user environment 200a via a network connection 206, wherein the remote network environment 200b may include one or more data processing devices (e.g. including the resource server 204) used by the developer 201 to develop, access, or run the one or more applications 203. For example, the one or more data processing devices may include one or more backend servers 102, 120 and/or one or more client devices 150a, 150b of FIG. 1. The developer may access the application 203 through the browser or any other suitable computer program 202, wherein the application may require access to the one or more remote resources 205a, 205b executed by the resource server 204. The resource server may be implemented as a single server or as a server platform with multiple servers, for example, the server 204 may include multiple parallel-processing nodes that perform task for the application in parallel.

In an aspect, the configuration 208 is made available for re-use at a central component 211. This may provide an advantage that the administrator (or application developer 201 at development time) only needs to setup protocol-specific attributes and information once per resource server 204. By defining the reusable configuration 209 centrally, it only needs to be declared once and maintained and can be accessed by several applications 203. The user environment 200a may further include storage (e.g., a database) 210 for storing of the re-usable configuration information and/or tokens as explained below in context of FIGS. 4, 5, and 6. The framework 211 may be communicatively coupled to the storage and may retrieve, access, update, add or delete data that is stored in the storage. Thus, while FIG. 2A shows the general setup with a configuration 208, FIG. 3A adds the aspect of the reusable configuration 209. The call 207 to the resource server 204 is moved to the framework 211. Technically speaking, the framework 211 takes care for this communication 207. The application 203 may delegate this call 207 to the framework 211—which may make the usage for the application 203 much easier.

In an aspect, the reusable configuration 209 may store central information about which resources can be accessed. For example, the configuration 208 can be split: Applications 203 can declare in 208 the required list of resources 205 and point to the reusable central configuration 209. This can provide an advantage of lower effort for application developers 201. They simply need to know which resources 205a, 205b they want to access and which scopes the resources belong to, but do not need additional configuration details that are specific to the protocol 207. The scope is defining which resource 205a, 205b at the resource server 204 shall be accessed. The scope is a literal that is interpreted at the resource server 204, and the latter knows which resource 205a, 205b is to be accessed for a given scope. Note that the resources are no longer listed in the reusable part, but that the application 203 declares which resources 205 to use. In addition, the application declares which reusable configuration 209 is used.

In an aspect, a file 209 associated with the application 203 and stored in the central framework 211 is containing the list of resources 205 as defined by the application 203, i.e. identifiers for resources 205a and 205b. The reusable configuration 209 contains the technical information to connect to the resource server 204 and is provided by the central framework 211. For example, configuration 208 may include an identifier of the reusable configuration 209 and/or an identifier for each resource 205 to be used by the application 203:

"clientReference" that points to 208: "ID of Client Configuration" 208,
"mandatoryResources" 205: ["Resource 1" 205a, "Resource 2" 205b, " . . . "], and optionally:
"description":"Test description", and
"optionalResources":["Optional Resource 1"]

In an aspect, the reusable configuration 209 may include an identifier of the user environment 200a at the server 204 and authentication information (e.g. a password to the resource server 204) and/or address information for the resources 205a, 205b and/or resource server 204 (e.g. uniform resource locators):

"clientID at resource server": "abc123",
"authentication information to resource server": "password—pointer to secure store",
"clientAuthType":"basic authentication",
"tokenEndpointURL":"NAME.com/token",
"revocationEndpointURL": "NAME.com/revocation",
"authorizationEndpointURL": "NAME.com/authorize",
"optional information . . . ": " . . . ", wherein "NAME" may be the company or administrator operating the resource server 204.

For example, suppose, a user works in the ABAP (Advanced Business Application Programming) system AB1 in which an application runs that wants to show calendar information, provided by a company, of the user. In this case, the user delegates the authorization to access his calendar data to system AB1. The step in which the user lets the company know that he consents with the system AB1 accessing his data is not shown in the figures, it is however part of the OAuth standard within the so called "authorization code flow. Hence, the identifier in the reusable configuration 209 is the ID that identifies system AB1 at the company.

FIG. 3B shows that the application 203 that wants to access this resource server 204 may declare which reusable configuration 209 it uses. As the configuration may be reused, up to M applications can point to this reusable configuration 209 (with M being the number of applications), wherein each application demands a certain number of resources 205.

In an aspect, the resource server 204 can require a list of resources 205. In addition, the resource server 204 can remember information about the resources to which access was granted. For example: Suppose Application 1 first accesses resource A. This can be remembered by the resource server. In a second call, Application 2 accesses resources 1 and N. Both applications use the same reusable configuration 209—the resource server can see them as the same caller. When Application 2 calls the resource server, the access to resource N will be rejected or needs to be made available according to how the resource server handles this. By telling the resource server about the condensed list of resources, subsequent calls by other applications (in the example: by application N) can be processed by the resource server by returning the desired resources.

To achieve this, the central configuration 209 introduces a function to calculate the maximum list of resources 212 for a given configuration. The configuration 209 may be extended by a function to calculate the maximum list of resources from all applications 203. For example, if application A requires resources 1 and 2, and application B requires resources 2 and 3 only, then the maximum list of required resources is (1, 2, 3). Thus, the list of maximum number of resources 212 is a union of the lists of resources of the applications executable by the client so that the individual lists (e.g., (1, 2) and (2, 3) from above) are combined, keeping only distinct elements or removing repeated elements from the combined list.

In an aspect, whenever an application is added to the collection of existing applications 203, it informs its own list of resources. When—at runtime—the resource server 204 is contacted, the function "maximum list of resources" may be called and may provide the current up-to-date maximum list that will be used for the call. This function internally loops over the information at the applications. This may also cover a situation in which the number of applications M in a system can vary by adding and removing applications. Each addition and removal can update the central information 209 on which the calculation of "maximum list of resources" is based. The resource server may only need to change any information about the application in case the maximum list of resources adds any resources that were not asked for in an earlier call. This may provide the advantage that once the resource server 204 was called by any application 203, all other applications can use the same way to call the resource. If applications are dynamically added or removed, the calculation can take this into account. Depending on whether or not new resources 205 appear in the list, the resource server 204 can act accordingly.

Usually, when a new application requires a new resource, the resource server 204 is informed when this application is accessed for the first time. This can help ensure non-disruptive behavior, i.e. other applications may not notice when additional applications are added. This can keep the number of complete round-trips for token acquisition low and may also minimize the required number of interactions for the developer 201, thereby improving bandwidth load, data processing time, and the user experience significantly. The "token" may be an access authentication for the resources 205a, 205b on the resource server 204. The token is a string received by the resource server 204. It represents the user consent for a system to access certain resources 205a, 205b at the resource server 204. Let's get back to our example above: User is on ABAP system AB1. This system AB1 accesses the user's calendar information on behalf of the user. The "key" to this access is the access token. The company issues this token to AB1 and remembers it. The system AB1 will store the token. As soon as the user runs the respective information, AB1 will retrieve the token, and present it to the company together with the request to access the calendar of the user. By comparing the information that the company kept on this, the company can verify the correctness of the token. If it is correct, the access will be granted. The company may remember for which applications the token was granted and may check whether the calendar was part of the grant. Thus, when the resource server receives the call or request, it also receives the token. The server compares this token with its own information: The server has the same token, and can hence verify that this user has granted access to the resource. After this successful check the resource server will return the resource.

Figure 4:
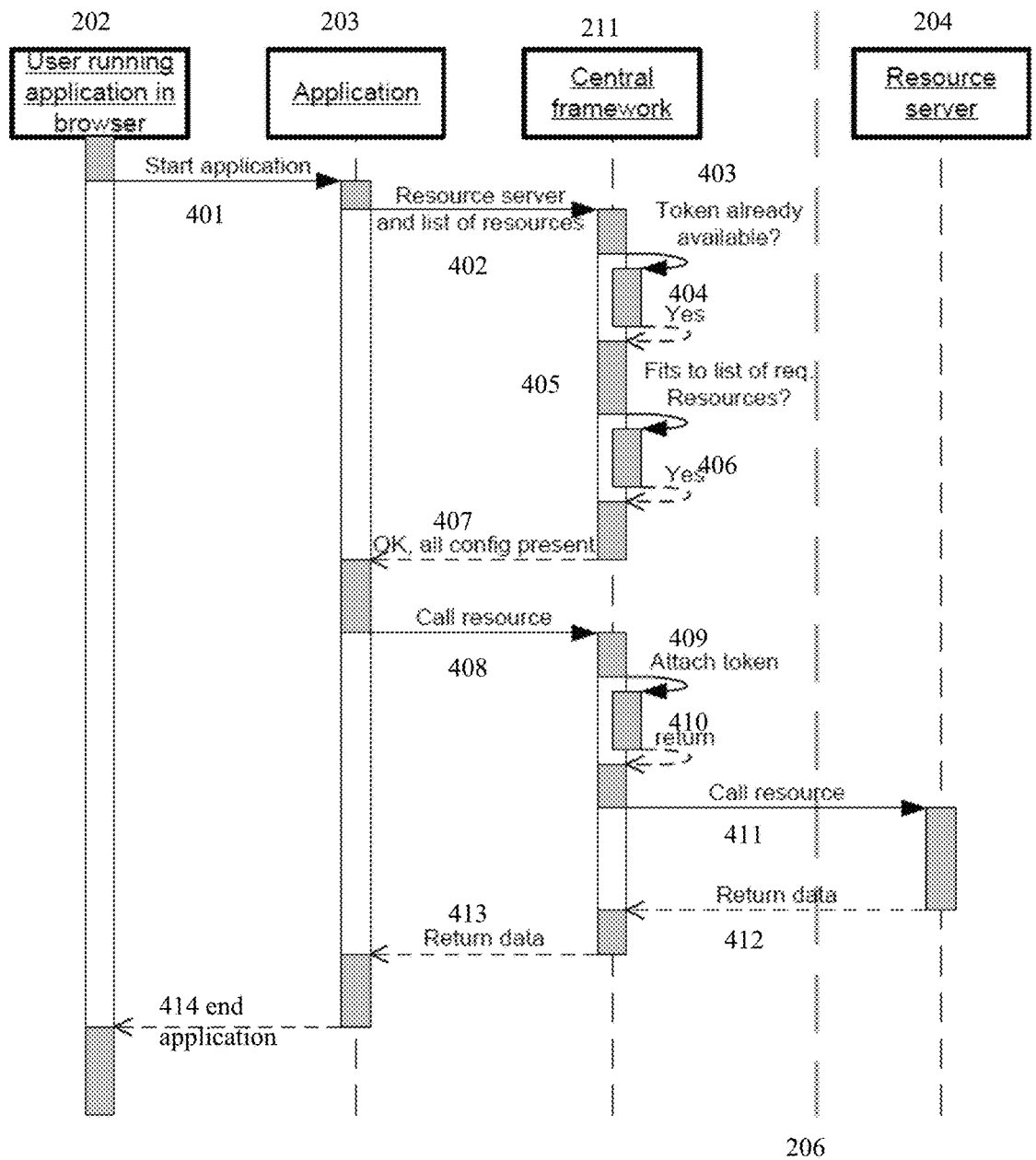
FIG. 4 illustrates an exemplary application development workflow according to an implementation.
Figure 5:
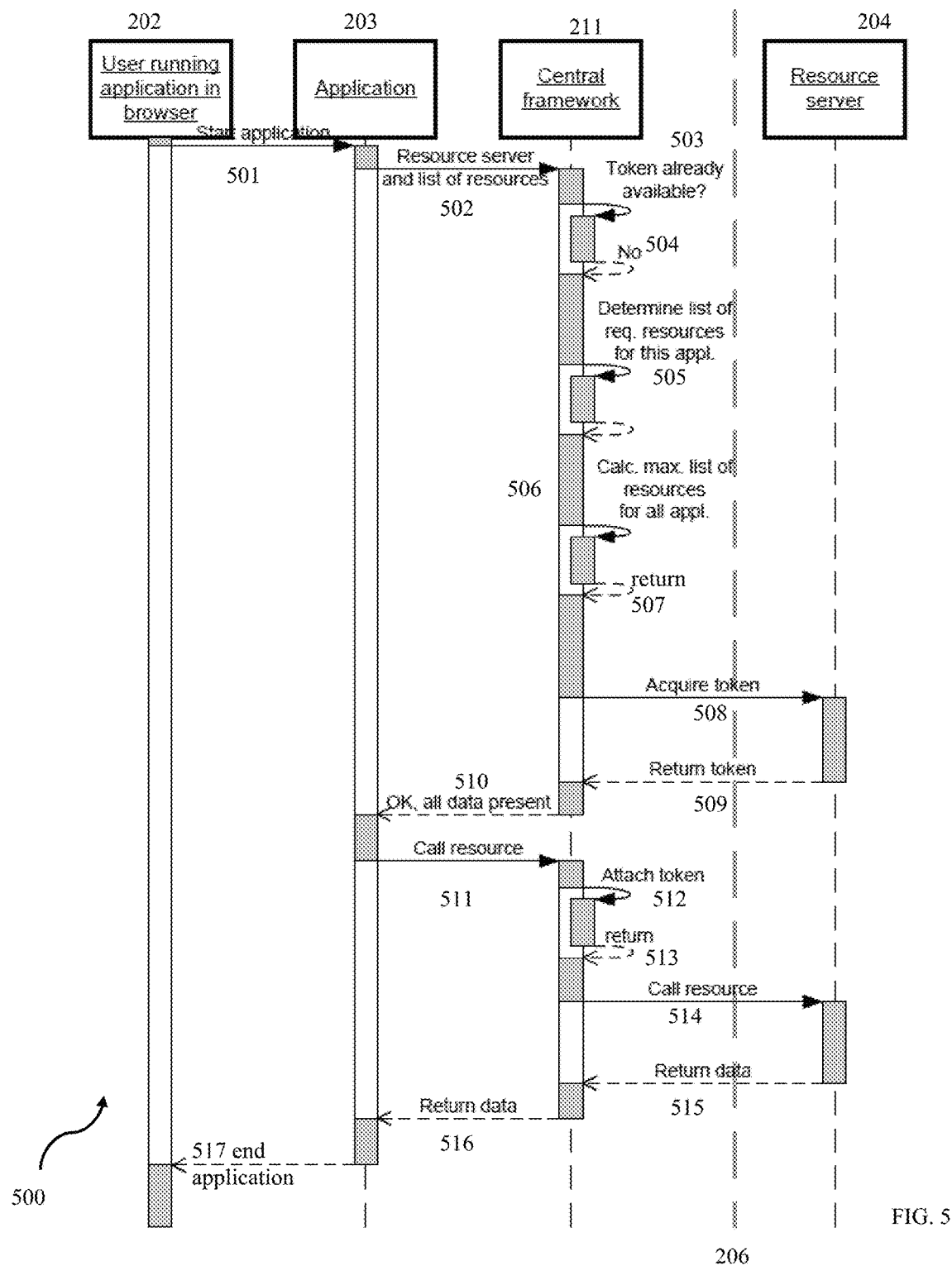
FIG. 5 illustrates an exemplary application development workflow according to an implementation.
Figure 6:
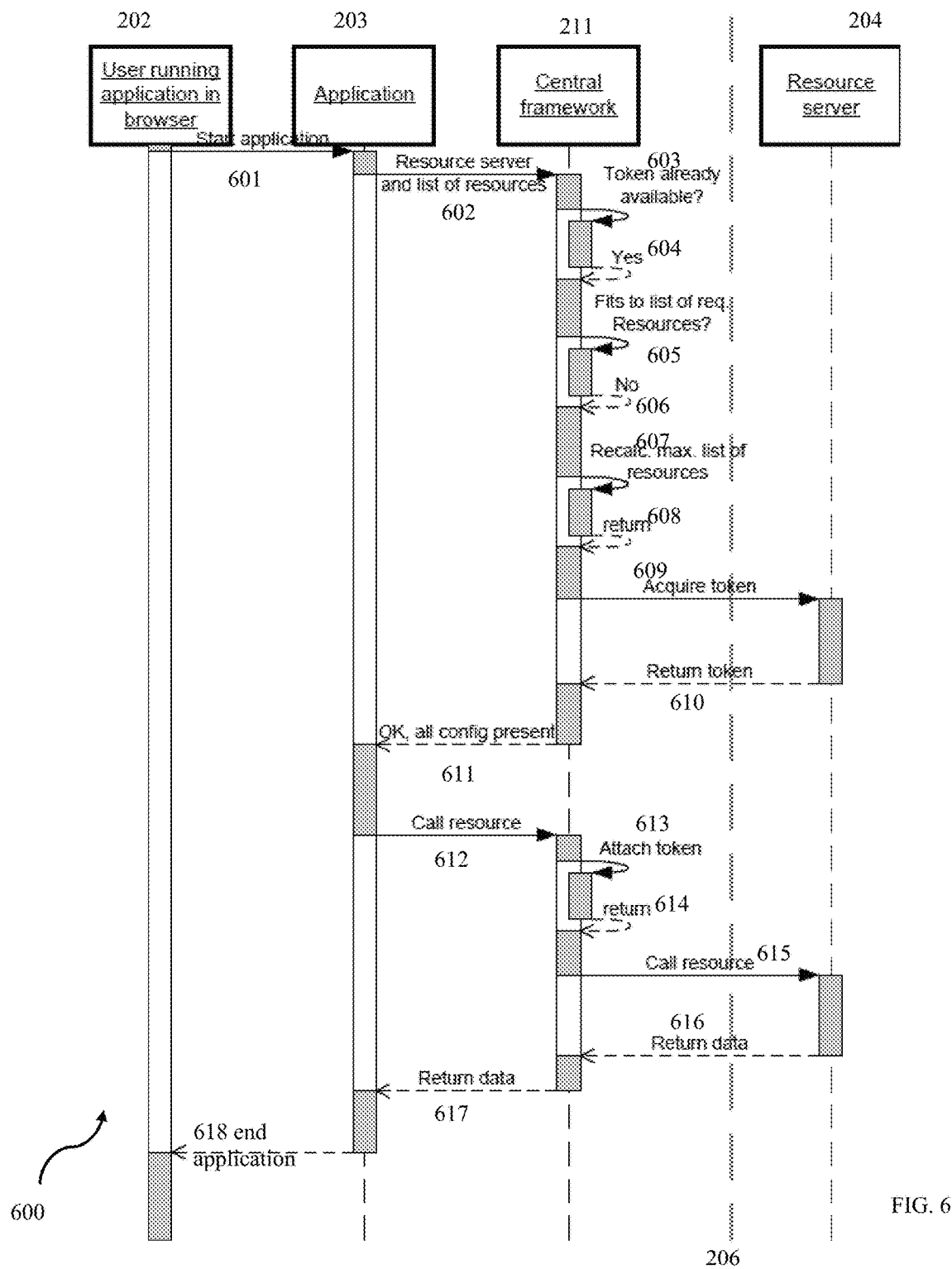
FIG. 6 illustrates an exemplary application development workflow according to an implementation.

FIGS. 4, 5, 6 illustrate examples of a method 400, 500, 600 for using an application across a distributed network environment 200. The FIGS. 4, 5, and 6 show call sequences for three different situations: complete token there (FIG. 4), no token there (FIG. 5), token there, but insufficient (FIG. 6). The method 400, 500, 600 may comprise: receiving, at a server 102, 120 and from a client device 150a, 150b, a first request including an identifier of a configuration file accessible to the server and one or more identifiers for one or more resources operated by a remote resource server 204, wherein the resources are requested by an application executed on the client device; in response to the request, retrieving, by the server, one or more tokens associated with the requested resources; transmitting, by the server, a second request to the remote resource server, the second request including the tokens and identifying one or more data processing tasks to be performed by the resources for the application; and receiving, by the server and from the remote resource server, result data that was outputted by the resources executing the data processing tasks.

FIG. 4 illustrates an exemplary application workflow 400 according to an implementation. Process flow 400 shows operations in case a token already is available, it fits to what the application needs, and the resource can be called directly.

At 401, the application 203 is started by the user 201.

At 402, identifiers for the configuration information 209 and the resources 205 is provided to the central framework 211, e.g. to the database storing the re-usable configuration 209.

At 403, it is checked if a token for the requested resources is already available.

At 404, it is determined that the token is already available in the configuration 209 or storage 210.

At 405, it is determined if the available token list fits to what the application needs, e.g. to the requested resources needed by the application.

At 406, it is determined that the available token list fits to what the application needs, e.g. to the requested resources needed by the application.

At 407, a message is sent to the application that all required configuration parameters are present.

At 408, the application calls the resources in a first request using the central framework.

At 409, a token is attached to the request and at 410, the modified request is returned to the central framework.

At 411, the central framework 211 calls the resource on the resource server 204 by a second request the second request is the first request, enriched by the token. The framework takes the first request, adds the necessary information (e.g., the token), and then executes the second request to the resource server 204. The information included in the first request may be one or more of the following: 1. The information on where it is addressed (in our example above: the particular company), 2. The token—this may be sufficient to provide the company with the information about the user—the company then knows that the user has consented with the access to his calendar and will provide the resource (calendar in the above example).

At 412, the resource server 204 accesses the resource and executes a task as defined by the second request and returns the result data of the processing to the central framework 211. The request returns the resource (e.g., calendar) data.

At 413, the result data is returned to the application 203 and, at 414, the application 203 is ended by the user 201. If the framework 211 performed the call to the company, it receives the information from 412. The framework 211 may then forward the returned resource to 203.

FIG. 5 illustrates an exemplary application development workflow 500 according to an implementation. Process 500 shows the operational flow when no token is available. The application specific configuration is evaluated, and the resource requirements of all active application are taken into account to calculate the maximum list of resources. With this, the token can be acquired, and the resource finally can be called.

At 501, the application 203 is started by the user 201.

At 502, identifiers for the configuration information 209 and the resources 205 is provided to the central framework 211, e.g. to the database storing the configuration 209.

At 503, it is checked if a token for the requested resources is already available.

At 504, it is determined that the token is not available in the configuration 208.

At 505, the list of required resources for the application 203 is determined.

At 506, the maximum list of resources for all applications is determined.

At 507, the determined maximum list of resources for all applications is returned.

At 508, the central framework 211 requests the tokens in a first request from the resource server 204.

At 509, the token is returned to the central framework for inclusion in the list of tokens. The framework may store the token in storage 210.

At 510, it is determined that all required configuration information is present in 209.

At 511, the application calls a resource it needs in a second request.

At 512, the central framework attaches the token to the request and returns the modified request.

At 514, the central framework 211 calls the resource on the resource server 204 by a third request. The "second" and "third" request within this description correspond to the "first" and "second" request of the former FIG. 4.

At 515, the resource server 204 accesses the resource and executes a task as defined by the third request and returns the result data of the processing to the central framework 211.

At 516, the result data is returned to the application 203 and, at 517, the application 203 is ended by the user 201.

FIG. 6 illustrates an exemplary application development workflow 500 according to an implementation. In process 600, a new application is accessing a new resource. This means: A token is already in the configuration information 209 or storage 210, but does not cover the resource for this new application. Hence, the maximum list of resources is recalculated, now contains the necessary resource, a new token is acquired, and the resource can be called. Note that for the existing applications, the process flow will look like process 400.

At 601, the application 203 is started by the user 201.

At 602, identifiers for the configuration information 209 and the resources 205 is provided to the central framework 211, e.g. to the database storing the configuration 209.

At 603, it is checked if a token for the requested resources is already available.

At 604, it is determined that the token is already available in the configuration 208.

At 605, it is determined if the available token list fits to what the application needs, e.g. to the requested resources needed by the application.

At 606, it is determined that the available token list does not fit to what the application needs, e.g. to the requested resources needed by the application.

At 607, the maximum list of resources 212 is recalculated. The resource list 209 may be stored in a storage (database). Technically, this storage is delegated to the framework 211. Hence, the framework 211 may have access to the content of the resource lists. On this information, the union set (="maximum list of resources") 212 can be calculated.

At 608, the maximum list of resources is returned.

At 609, the central framework 211 requests the token in a first request from the resource server 204.

At 610, the token is returned to the central framework for storing in the storage 210.

At 611, it is determined that all required configuration information is present in 209.

At 612, the application calls a resource it needs in a second request.

At 613, the central framework attaches the token to the request and returns the modified request.

At 614, the modified second request is returned.

At 615, the central framework 211 calls the resource on the resource server 204 by a third request.

At 616, the resource server 204 accesses the resource and executes a task as defined by the third request and returns the result data of the processing to the central framework 211.

At 617, the result data is returned to the application 203 and, at 618, the application 203 is ended by the user 201.

In an exemplary embodiment of the present disclosure, using OAuth, an in-memory database may require that applications may be delivered in delivery units. These can be deployed independently. A customer decides which applications to deploy or even undeploy. This can change during the system lifetime. Applications may define HTTP destinations to model an HTTP based connectivity to a certain target system, including the authentication mechanism to be used. By introducing OAuth, a new authentication type is introduced for HTTP destinations. When accessing resources that are protected by OAuth, the information about the OAuth client is needed. This includes the endpoints to which OAuth requests will be sent, the client credentials (with which the authentication to the OAuth server will be performed), as well as the list of scopes for which access is requested.

If each application delivers own OAuth client configurations, huge efforts by the administrator are required for maintenance. For example, if a number of applications want to access resources from an ABAP backend, this would mean that each application would need to store complete sets of attributes with endpoints to this ABAP system etc. For each application, individual client credentials would be required at server side. For administrators, this would mean the need to create new client credentials every time after a new application was deployed. This increases the total cost of ownership (TCO) for customers using such applications, and in addition causes effort for application development, as the client configuration needs to be supplied. For example, the OAuth client may be made available for re-use in the central framework. Applications may only need to declare the required scopes (e.g., resource accesses) of a given OAuth client. Applications can reuse the central OAuth client configuration and can still define own clients by using the so-called "flavor". The flavor defines which implementation will be called and covers specific deviations from the OAuth standard by existing OAuth servers. At deployment time, the scopes of an application are informed to the central OAuth client. From these declared scopes across all applications, the central component may dynamically aggregate a maximum list of scopes. When trying to access a resource protected by OAuth, this maximum list of scopes will be used to acquire an OAuth access token. For the deployment of new applications a new application may try to access the requested resource for the first time. At runtime, the existing access token may be evaluated. The dynamic determination may include: The runtime logic may see that its scopes are not sufficient and discard the token. With the new maximum list of scopes, a new access token will be acquired and persisted. All other applications can then re-use this token.

In an aspect, the re-usable client configurations 208 may be introduced to both keep TCO low (lower effort for administrators) and keep the number of complete roundtrips for OAuth token acquisition low. Finally, for the interactive OAuth Authorization code flow, this also minimizes the required number of interactions for the end-user, improving the user experience significantly.

The preceding figures and accompanying description illustrate example processes and computer implementable techniques. But network environment 100, 300 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, each network environment may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus," "computer," or "electronic computer device" (or equivalent as understood by one of ordinary skill in the art) refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method for deploying an application across a distributed network environment, the method comprising:
receiving, at a server and from a client device, a first request including an identifier of a configuration file accessible to the server and one or more identifiers for one or more resources operated by a remote resource server, wherein the resources are requested by an application executed on the client device;
in response to the request, retrieving, by the server from the remote resource server, one or more tokens associated with the requested resources, wherein before the retrieving of the one or more tokens associated with the requested resources, pre-processing of a maximum number of resources required by the application, wherein the pre-processing comprises adding to the configuration file only resources from a list of determined required resources for the application that are not already included in the configuration file to render a maximum number of resources list, wherein the retrieving of the one or more tokens associated with the requested resources includes retrieving the one or more tokens for the resources in the maximum number of resources list from the remote resource server, and wherein the maximum number of resources list is recalculated based on a determination that a list of tokens available to the application based on the configuration file is inconsistent with needed resources requested by the application;
transmitting, by the server, a second request to the remote resource server, the second request including the one or more tokens and identifying one or more data processing tasks to be performed by the resources for the application; and
receiving, by the server and from the remote resource server, result data that was outputted by the resources executing the data processing tasks.

2. The method of claim 1, wherein the configuration file includes address data for the remote resource server and the resources operated by the remote resource server, wherein the address data is used for the second request to initiate the execution of the data processing tasks by the resources.

3. The method of claim 1, wherein the one or more tokens include client device authentication data for the remote resource server or the resources, wherein the authentication data is used for the second request to initiate the execution of the data processing tasks by the resources.

4. The method of claim 1, wherein the remote resource server is communicatively connected with the server using a local or wide area network connection but is not directly connected with the client device.

5. The method of claim 1, wherein the application does not contain address data for the remote resource server or the resources.

6. The method of claim 2, wherein the address data includes one or more uniform resource locators (URLs) that identify the remote resource server and the associated resources and wherein the second request uses the URLs to connect the server to the resources of the remote resource server.

7. The method of claim 1, wherein the identifier of the configuration file includes a name of the file and an identifier of a location on a data storage connected with the server.

8. The method of claim 1, further comprising:
determining the list of all required resources for the application;
determining that some of the determined all required resources in the list are already included in the configuration file;
determining that some of the determined all required resources in the list are not already included in the configuration file.

9. The method of claim 1,
wherein the pre-processing comprises:
determining a list of all required resources for the application;
determining that a token stored in a storage is not valid for one or more of the required resources for the application;
storing the list in the storage;
wherein the retrieving of the one or more tokens associated with the requested resources includes retrieving the one or more tokens for the list of required resources from the remote resource server.

10. The method of claim 1, further comprising:
performing, by the server, a parallel pre-processing wherein the parallel pre-processing comprises:
determining at least one criterion associated with the data processing tasks; based on the determined criterion, selecting a number of resources to use in the data processing tasks processing by the remote resource server, and performing the task processing by the remote resource server based on the selected number of resources.

11. The method of claim 1, further comprising:
receiving, by the server, a command to add or remove an application executable by the client device;
updating, by the server, a list of resources required for all current applications executable by the client device, wherein the list of resources required for all current applications executable by the client device is stored in the configuration file;
wherein the retrieving of the one or more tokens associated with the requested resources includes retrieving the one or more tokens for the updated list of resources required for all current applications executable by the client device from the remote resource server.

12. A computer program product encoded on a non-transitory, tangible storage medium, the product comprising computer readable instructions for causing one or more computers to perform operations for providing deploying an application across a distributed network environment, the operations comprising:
receiving, at a server and from a client device, a first request including an identifier of a configuration file accessible to the server and one or more identifiers for one or more resources operated by a remote resource server, wherein the resources are requested by an application executed on the client device;
in response to the request, retrieving, by the server from the remote resource server, one or more tokens associated with the requested resources, wherein before the retrieving of the one or more tokens associated with the requested resources, pre-processing of a maximum number of resources required by the application, wherein the pre-processing comprises adding to the configuration file only resources from a list of determined required resources for the application that are not already included in the configuration file to render a maximum number of resources list, wherein the retrieving of the one or more tokens associated with the requested resources includes retrieving the one or more tokens for the resources in the maximum number of resources list from the remote resource server, and wherein the maximum number of resources list is recalculated based on a determination that a list of tokens available to the application based on the configuration file is inconsistent with needed resources requested by the application;
transmitting, by the server, a second request to the remote resource server, the second request including the one or more tokens and identifying one or more data processing tasks to be performed by the resources for the application; and
receiving, by the server and from the remote resource server, result data that was outputted by the resources executing the data processing tasks.

13. A system for providing an application across a distributed network environment, the system comprising:
a server; and
a processor-readable medium coupled to the server having instructions stored thereon which, when executed by the server, cause the server to perform operations comprising:
receiving, at the server and from a client device, a first request including an identifier of a configuration file accessible to the server and one or more identifiers for one or more resources operated by a remote resource server, wherein the resources are requested by an application executed on the client device;
in response to the request, retrieving, by the server from the remote resource server, one or more tokens associated with the requested resources, wherein before the retrieving of the one or more tokens associated with the requested resources, pre-processing of a maximum number of resources required by the application, wherein the pre-processing comprises adding to the configuration file only resources from a list of determined required resources for the application that are not already included in the configuration file to render a maximum number of resources list, wherein the retrieving of the one or more tokens associated with the requested resources includes retrieving the one or more tokens for the resources in the maximum number of resources list from the remote resource server, and wherein the maximum number of resources list is recalculated based on a determination that a list of tokens available to the application based on the configuration file is inconsistent with needed resources requested by the application;
transmitting, by the server, a second request to the remote resource server, the second request including the one or more tokens and identifying one or more data processing tasks to be performed by the resources for the application; and
receiving, by the server and from the remote resource server, result data that was outputted by the resources executing the data processing tasks.

14. The system of claim 13, wherein the configuration file includes address data for the remote resource server and the resources operated by the remote resource server, wherein the address data is used for the second request to initiate the execution of the data processing tasks by the resources.

15. The system of claim 13, wherein the one or more tokens include client device authentication data for the remote resource server or the resources, wherein the authentication data is used for the second request to initiate the execution of the data processing tasks by the resources.

16. The system of claim 13, wherein the remote resource server is communicatively connected with the server using a local or wide area network connection but is not directly connected with the client device.

17. The system of claim 13, the operations further comprising:

determining the list of all required resources for the application;

determining that some of the determined all required resources in the list are already included in the configuration file;

determining that some of the determined all required resources in the list are not already included in the configuration file.

18. The system of claim 13, before the retrieving of the one or more tokens associated with the requested resources, wherein the pre-processing comprises:

determining a list of all required resources for the application;

determining that a token stored in a storage is not valid for one or more of the required resources for the application;

storing the list in the storage;

wherein the retrieving of the one or more tokens associated with the requested resources includes retrieving the one or more tokens for the list of required resources from the remote resource server.

19. The system of claim 13, the operations further comprising:

receiving, by the server, a command to add or remove an application executable by the client device;

updating, by the server, a list of resources required for all current applications executable by the client device, wherein the list is stored in a storage;

wherein the retrieving of the one or more tokens associated with the requested resources includes retrieving the one or more tokens for the updated list of resources required for all current applications executable by the client device from the remote resource server.

* * * * *